US012577141B2

(12) United States Patent
Ito et al.

(10) Patent No.: US 12,577,141 B2
(45) Date of Patent: Mar. 17, 2026

(54) GLASS AND METHOD FOR PRODUCING THE SAME, AND MEMBER AND APPARATUS USING THE SAME

(71) Applicant: TOSOH CORPORATION, Yamaguchi (JP)

(72) Inventors: Masahiro Ito, Kanagawa (JP); Kazuyoshi Arai, Kanagawa (JP)

(73) Assignee: TOSOH CORPORATION, Yamaguchi (JP)

( * ) Notice: Subject to any disclaimer, the term of this patent is extended or adjusted under 35 U.S.C. 154(b) by 397 days.

(21) Appl. No.: 17/722,660

(22) Filed: Apr. 18, 2022

(65) Prior Publication Data

US 2022/0332623 A1     Oct. 20, 2022

(30) Foreign Application Priority Data

Apr. 20, 2021     (JP) ................................. 2021-070929

(51) Int. Cl.
*C03B 5/225*     (2006.01)
*C03C 3/062*     (2006.01)

(52) U.S. Cl.
CPC .............. *C03B 5/225* (2013.01); *C03C 3/062* (2013.01)

(58) Field of Classification Search
CPC ........... C03C 3/06; C03C 3/076; C03C 3/078; C03C 3/083; C03C 3/085; C03C 3/087
See application file for complete search history.

(56) References Cited

U.S. PATENT DOCUMENTS

| | | | | |
|---|---|---|---|---|
| 4,414,014 A | * | 11/1983 | Bruning | ................... C03B 32/00 |
| | | | | 65/61 |
| 7,084,084 B2 | | 8/2006 | Arai et al. | |
| 7,365,037 B2 | * | 4/2008 | Sato | ......................... C03B 19/06 |
| | | | | 501/72 |
| 7,661,277 B2 | * | 2/2010 | Sato | ......................... C03B 19/01 |
| | | | | 65/17.2 |
| 7,905,932 B2 | * | 3/2011 | Sato | .......................... C03C 1/00 |
| | | | | 501/17 |
| 8,017,536 B2 | * | 9/2011 | Weber | ........................ C03C 3/06 |
| | | | | 65/17.5 |
| 10,370,281 B2 | * | 8/2019 | Ono | ...................... C03B 32/005 |
| 2003/0176269 A1 | * | 9/2003 | Arai | ......................... C03C 3/095 |
| | | | | 501/64 |
| 2020/0290913 A1 | * | 9/2020 | Martin | ...................... C03B 5/06 |

FOREIGN PATENT DOCUMENTS

| | | | | | |
|---|---|---|---|---|---|
| CN | 100408497 | C | | 8/2008 | |
| DE | 102004006017 | A1 | * | 7/2005 | ............. C03B 19/06 |
| JP | 05-217946 | A | | 8/1993 | |
| JP | H0912322 | A | * | 1/1997 | ............. C03B 19/06 |
| JP | 10-114533 | A | | 5/1998 | |
| JP | 10-236871 | A | | 9/1998 | |
| JP | 10-275524 | A | | 10/1998 | |
| JP | H11157916 | A | * | 6/1999 | |
| JP | H11278858 | A | * | 10/1999 | ............. C03B 32/02 |
| JP | 3128451 | B2 | * | 1/2001 | ......... C03B 19/1065 |
| JP | 2003292337 | A | * | 10/2003 | ............. C03C 3/06 |
| JP | 2004284828 | A | * | 10/2004 | ............... C03C 3/06 |
| JP | 3988211 | B2 | * | 10/2007 | ............... C03C 3/06 |
| JP | 4022678 | B2 | * | 12/2007 | ............. C03B 19/09 |
| JP | 2008056533 | A | * | 3/2008 | ........... C03B 19/063 |
| TW | 200521099 | A | | 7/2005 | |
| WO | WO-2018229151 | A1 | * | 12/2018 | ........... C01B 33/183 |

OTHER PUBLICATIONS

JP2003292337A EPO Machine Translation retrieved May 16, 2025. (Year: 2025).*
JPH11157916A EPO Machine Translation Retrieved Sep. 11, 2025. (Year: 2025).*
JP-H11278858-A Machine Translation by Clarivate Analytics Retrieved Sep. 12, 2025. (Year: 2025).*
Extended European Search Report issued in the corresponding European Patent Application No. 22168468.1 dated Oct. 5, 2022.
Office Action, dated Jul. 2, 2025, that issued in the corresponding European Patent Application No. 22168468.1.
Office Action, dated Jul. 10, 2025, that issued in the corresponding Taiwanese Patent Application No. 111112379, along with its English translation.

* cited by examiner

*Primary Examiner* — Lisa L Herring
(74) *Attorney, Agent, or Firm* — Greenblum & Bernstein, P.L.C.

(57)     ABSTRACT

Methods for producing a glass that contains no bubbles with diameters of more than 0.1 mm and in which the occupied area fraction of bubbles with diameters of 0.1 mm or less is 0.05% or less, the methods including: placing raw material powders for at least one oxide of Si and a di- or higher-valent metal element in a container, mixing the raw material powders together and then melting the mixture by heating under reduced pressure to obtain a melt; pressurizing the melt in a He gas atmosphere, or heating the melt in an inert gas atmosphere other than a He gas atmosphere and then pressurizing the melt in the inert gas atmosphere; and cooling the melt.

14 Claims, 3 Drawing Sheets

GLASS AND METHOD FOR PRODUCING THE SAME, AND MEMBER AND APPARATUS USING THE SAME

BACKGROUND OF THE INVENTION

1. Field of the Invention

The present invention relates to glasses and methods for producing the glasses and to members and apparatuses using the glasses. More specifically, the present invention relates to a quartz-based Glass with high durability and a method for producing the glass and to a member and an apparatus using the glass.

2. Description of the Related Art

Production apparatuses using plasma have been frequently used in the field of semiconductor production and the field of liquid crystal production. The recent miniaturization or semiconductor integrated circuits has increased the importance of dry etching processes using plasma. In these production processes, the use of halide gases such as fluorine-based gases and chlorine-based gases is essential.

Quartz glass members have been frequently used as members that form interiors of apparatuses using plasma, since these members have good radio-frequency permeability and can be produced in complicated shapes at relatively low cost and with high purity. However, etching proceeds from a portion of the surface of quartz glass that contacts halide gas and its plasma. Thus, quartz glass members are gradually etched during use, which results in a thickness reduction phenomenon. The thickness reduction phenomenon in quartz glass not only decreases the life of quartz glass members but can also lead to abnormal electrical discharge.

To solve this problem, materials having lower plasma etching rates than quartz glass, for example alumina sintered bodies (see Japanese Unexamined Patent Application Publication No. H5-217946), yttrium-aluminum-garnet sintered bodies (see Japanese Unexamined Patent Application Publication No. H10-236871) and aluminum nitride sintered bodies (see Japanese Unexamined Patent Application Publication No. H10-275524), have been considered to be used for a portion that contacts plasma. However, these materials have problems such as decreased yields in semiconductors and liquid crystals because particles come off from crystal grain boundaries when the thickness reduction occurs. In addition, it is difficult to produce high-purity raw material powders for producing these materials. Furthermore, materials such as alumina have a lower workability than quartz glass, which results in increased cost of producing members.

On the other hand, there is a known quartz-based glass that is an oxide containing Si, Al and at least one of the group 2A, group 3A and group 4A elements in the periodic table in a particular ratio and that has sufficient durability as a member for a semiconductor production apparatus or liquid crystal production apparatus using a halide gas and/or its plasma (see Japanese Unexamined Patent Application Publication No. 2004-284828). This glass is a glass with high durability that contains no gas bubbles or cracks therein and that is substantially transparent to visible light.

The glass described in Japanese Unexamined Patent Application Publication. No. 2004-284828 has high durability. In particular, a glass containing relatively large amounts of Al and Y has high plasma resistance (see, for example, Sample No. 42 in Table 2 of Japanese Unexamined Patent Application. Publication No. 2004-284828). The glass condition or this glass is evaluated as "transparent", indicating that the glass contains no gas bubbles or cracks therein. However, there is no mention of the presence of bubbles with smaller diameters (hereinafter also referred. to as "Φ"), i.e., bubbles with Φ of more than 0.1 mm and the occupied area fraction of bubbles with Φ of 0.1 mm or less.

SUMMARY OF THE INVENTION

An object of the present invention is to provide at least one of a glass or a method for producing the glass, wherein the glass contains no bubbles with Φ of more than 0.1 mm or cracks therein and has high. practical usefulness and higher plasma resistance.

Another object of the present invention is to provide at least one of a glass member comprising the above glass or a semiconductor production apparatus or liquid crystal production apparatus comprising the glass member.

The inventors have conducted research in order to solve the above problem. As a result, the inventors have found that an oxide of Si and at least one di- or higher-valent metal element which contains no bubbles with diameters of more than 0.1 mm and in which the occupied area fraction of bubbles with diameters of 0.1 mm or less is 0.05% or less can be obtained by pressurizing a melt of an oxide of Si and at least one di- or higher-valent metal element in a He gas atmosphere or by heating the melt in an inert gas atmosphere other than a He gas atmosphere and then pressurizing the melt in the inert gas atmosphere, thus completing the present invention.

The present invention is as described in the claims, and a summary of the present invention is as follows:

[1] A glass comprising at least one oxide of Si and a or higher-valent racial element, the glass containing no bubbles with diameters of more than 0.1 mm, wherein an occupied area fraction of bubbles with diameters of 0.1 mm or less is 0.05% or less.

[2] The glass according to [1] above, wherein the occupied area fraction is 0.003% or less.

[3] The glass according to [1] or [2] above, wherein the oxide of the di- or higher-valent metal element is an oxide of at least one element (M) selected from the group consisting of Al and a group 2 element, a group 3 element and a group 4 element in the periodic table.

[4] The glass according to [1] above, comprising an oxide of Si, Al and at least one element (M) selected from the group consisting of a group 2 element, a group 3 element and a group 4 element in the periodic table.

[5] The glass according to any one of [1] to [4] above, wherein the oxide comprises an oxide of Si, an oxide of Al and an oxide of a group 3 element.

[6] The glass according to any one of [3] to [5], wherein the group 3 element is Y, La or Ce.

[7] The glass according to any one of [1] to [6], wherein a content of Si is 30 atomic percent or more of a content of all metal elements comprising Si and the di- or higher-valent metal element.

[8] The glass according to any one of [4] to [7], wherein a sum of a content of Al and a content of the at least one element (N) selected from the group consisting of a group 2 element, a group 3 element and a group 4 element in the periodic table is 25 atomic percent or more of a content of all metal elements.

[9] The glass according to any one of [4] to [8], wherein an atomic ratio of the at least one element (M) selected from the group consisting of a group 2 element, a group 3 element and a group 4 element in the periodic table to Al is 0.05 or more and 20 or less.

[10] A glass member comprising the glass according to any one of [1] to [9] above.

[11] A semiconductor production apparatus comprising the glass member according to [10] above.

[12] A liquid crystal production apparatus comprising the glass member according to [10] above.

[13] A method for producing a glass, comprising the steps of:

(1) placing raw material powders for at least one oxide of Si and a di- or higher-valent metal element in a container, mixing the raw material powders together and then melting the mixture by heating under reduced pressure to obtain a melt;

(2-1) pressurizing the melt in a He gas atmosphere, or (2-2) heating the melt in an inert gas atmosphere other than a He gas atmosphere and then pressurizing the melt in the inert gas atmosphere; and (3) cooling the melt.

[14] The production method according to [13] above, wherein the reduced pressure in step (1) is 10 Torr or less, and a heating temperature in step (1) is 1,500° C. or higher.

[15] The production method according to [13] or [14] above, wherein a pressure during the pressurization in the He gas atmosphere in step (2-1) is 0.05 MPa or more.

[16] The production method according to any one of [13] to [15] above, wherein the pressurization in the He gas atmosphere in step (2-1) is pressurization at a temperature of 1,500° C. or higher and 2,000° C. or lower.

[17] The production method according to any one of [13] to [16] above, wherein. the inert gas atmosphere other than a He gas atmosphere in step (2-2) is at least one of a nitrogen gas atmosphere or an Ar gas atmosphere.

The present invention allows to provide a glass that contains no bubbles with $\Phi$ of more than 0.1 mm or cracks therein and that has high practical usefulness and higher plasma resistance.

This glass is a glass with high durability that is suitable for use as a member for a semiconductor production apparatus or liquid crystal production apparatus using a halide gas and its plasma. Furthermore, this glass has high purity and maintains the good workability and low-dusting properties of quartz-based glasses.

The glass of the present invention, containing no bubbles with $\Phi$ of more than 0.1 mm or cracks therein, is a glass having a uniform appearance with few defects. Thus, it is possible to reduce the risk of dusting when inner gas bubbles are exposed in the surface of a member due to wear during etching, and it is also possible to inhibit abnormal electrical discharge due to irregularities formed by bubbles exposed. in the surface.

DESCRIPTION OF THE PREFERRED EMBODIMENTS

Glass

Figure 1A:
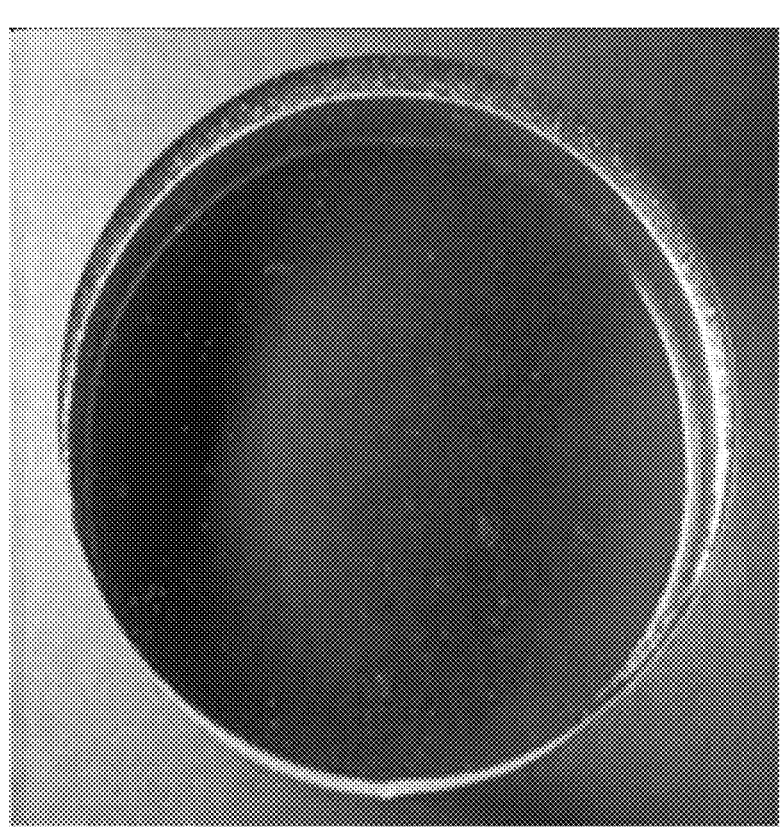
FIG. 1A is an illustration of a glass of Example 1.

A glass of the present invention is a glass which comprises at least one oxide of Si and a di- or higher-valent metal element, which contains no bubbles with diameters of more than 0.1 mm and in which the occupied area fraction of bubbles with diameters of 0.1 mm or less is 0.05% or less. Preferably, the present invention is a glass which comprises an oxide of Si and an oxide of a di- or higher-valent metal element, which contains no bubbles with diameters of more than 0.1 mm and in which the occupied area fraction of bubbles with diameters of 0.1 mm or less is 0.05% or less, more preferably a glass which comprises an oxide of Si and an oxide of a di- or higher-valent metal element other than Fe and Cu, which contains no bubbles with diameters of more than 0.1 mm and in which the occupied area fraction of bubbles with diameters of 0.1 mm or less is 0.05% or less. The terms "bubble" and "gas bubble" are used herein interchangeably.

In another embodiment, the present invention is preferably a glass which comprises at least one oxide of Si and a di- or higher-valent metal element, which contains no bubbles with diameters of more than 0.1 mm and in which the occupied area fraction of bubbles with diameters of 0.1 mm or less is 0.003% or less, more preferably a glass which comprises an oxide of Si and an oxide of a di- or higher-valent metal element, which contains no bubbles with diameters of more than 0.1 mm and in which the occupied area fraction of bubbles with diameters of 0.1 mm or less is 0.003% or less, even more preferably a glass which comprises an oxide of Si and an oxide of a di- or higher-valent metal element other than Fe and Cu, which contains no bubbles with diameters of more than 0.1 mm and in which the occupied area fraction of bubbles with diameters of 0.1 mm or less is 0.003% or less.

The composition of the glass of the present invention comprises at least one oxide of Si and a di- or higher-valent metal element (hereinafter also referred to as "multivalent metal element"). Because the glass comprises an oxide of Si and an oxide of at least one multivalent metal element, the glass tends to have high durability to plasma.

Examples of multivalent metal elements include Al and group 2 elements, group 3 elements and group 4 elements in the periodic table. The multivalent metal element present in the glass of the present invention is preferably a metal element other than a transition metal element, more preferably at least one selected from the group consisting of Al and a group 2 element, a group 3 element and a group 4 element in the periodic table, even more preferably at least one of Al or a group 3 element, yet even more preferably Al and a group 3 element.

Examples of group 2 elements include Be, Mg, Ca, Sr, Ba and Ra, preferably Mg, Ca, Sr and Ba. The group 2 element present in the glass of the present invention is preferably at least one selected from the group consisting of Be, Mg, Ca, Sr, Ba and Ra. Furthermore, the group 2 element present in the glass of the present invention is particularly preferably Sr since this element does not tend to adversely affect semiconductor devices because of its relatively large ionic radius and low mobility and also has no toxicity.

Examples of group 3 elements include Sc, Y, La, Ce, Pr, Nd, Pm, Sm, Eu, Gd, Tb, Dy, Ho, Er, Tm, Yb and Lu. The group 3 element present in the glass of the present invention is preferably at least one selected from the group consisting of Sc, Y, La, Ce, Pr, Nd, Pm, Sm, Eu, Gd, Tb, Dy, Ho, Er, Tm, Yb and Lu. In terms of cost, it is preferred that the group 3 element be an element such as Y, La or Ce, or at least one selected from the group consisting of Y, La and Ce. Furthermore, the group 3 element present in the glass of the present invention is preferably Y or La, more preferably Y, since these elements have no absorption in the visible region.

In addition, Al and Y, La or Ce preferably coexist in the glass of the present invention. The glass of this embodiment preferably contains an oxide of Al and an oxide of at least one of Y or La.

Examples of group 4 elements include Ti, Zr and Hf. The group 4 element present in the glass of the present invention is preferably at least one selected from the group consisting of Ti, Zr and Hf. In terms of cost, it is preferred that the group 4 element be Ti or Zr.

The oxide that forms the glass of the present invention is preferably an oxide of Si, Al and at least one element (M) selected from the group consisting of a group 2 element, a group 3 element and a group 4 element in the periodic table (at least one element selected from the group consisting of a group 2 element, a group 3 element and a group 4 element in the periodic table is hereinafter also collectively referred to as "M element"). That is, the glass of the present invention preferably comprises at least an oxide of Si, an oxide of Al and an oxide of an N element, more preferably at least an oxide of Si, an oxide of Al and an oxide of a group 3 element, even more preferably at least an oxide of Si, an oxide of Al and at least one of an oxide of Y or an oxide of La, yet even more preferably at least an oxide of Si, an oxide of Al and an oxide of Y. Furthermore, the oxide in the glass of the present invention preferably comprises an oxide of Si, an oxide of Al and an oxide of an M element, more preferably an oxide of Si, an oxide of Al and an oxide of a group 3 element, even more preferably an oxide of Si, an oxide of Al and an oxide or at least one of Y or La, yet even more preferably an oxide of Si, an oxide of Al and an oxide of Y.

The content of Si in the oxide that forms the glass of the present invention is 30 atomic percent or more, or 32 atomic percent or more, of the content of all metal elements comprising Si and multivalent metal elements (i.e., the atomic fraction of Si relative to the total content of Si and multivalent metal elements in the glass of the present invention). The content of Si is preferably 45 atomic percent or more of the content of all metal elements. From the viewpoint of plasma resistance, it is preferred that the content of Si be 90 atomic percent or less, 85 atomic percent or less, 80 atomic percent or less, 75 atomic percent or less, 70 atomic percent or less, 60 atomic percent or less or 45 atomic percent or less of the content of all metal elements.

Elements included in "metal elements" in the present invention are transition metal elements, typical metal elements and metalloid elements.

In the glass of the present invention, the total atomic fraction of multvalent metal elements relative to the total content of Si and multivalent metal elements (hereinafter also referred to as "multivalent metal content") is preferably less than 70 atomic percent or less than 68 atomic percent and is preferably more than 10 atomic percent, more than 40 atomic percent or more than 55 atomic percent.

For example, if the oxide that forms the glass of the present invention is an oxide of Si, Al and an M element, it is preferred that the sum of the content of Al and the content of the M element be 25 atomic percent or more (i.e., the multivalent metal content be 25 atomic percent or more) of the content of all metal elements from the viewpoint of plasma resistance. The sum of the content of Al and the content of the M element is preferably 35 atomic percent or more, or 40 atomic percent or more, of the content of all metal elements.

If the glass of the present invention contains two or more multivalent metal elements, the content of each multivalent metal element relative to the total content of Si and the multivalent metal elements (if the multivalent metal elements are M elements or the like, hereinafter also referred to as "M element content" or the like) may be any content that satisfies the above multivalent metal content. For example, the Al content and M element content of the glass of the present invention may satisfy the above multivalent metal content and may be the following respective values:

Al content: 10 atomic percent or more or 30 atomic percent or more, and 50 atomic percent or less or 45 atomic percent or less M element content: 5 atomic percent or more or 20 atomic percent or more, and 40 atomic percent or less or 30 atomic percent or less If the oxide that forms the glass of the present invention is an oxide of Si, Al and an M element, it is preferred that the atomic ratio of the M element to Al be 0.05 or more and 20 or less from the viewpoint of plasma resistance. The atomic ratio of the M element to Al is more preferably 0.5 or more and 10 or less, even more preferably 1 or more and 8 or less.

Furthermore, the atomic fraction of the M element to Al in the glass of the present invention is preferably more than 0, 0.1 or more or 0.4 or more, and 20 or less, 10 or less or 1 or less.

Although the glass of the present invention may contain impurities as long as the advantages thereof can be achieved, the glass preferably contains no metal impurities besides Si and multivalent metal elements. For example, incidental impurities present in the glass of the present invention may be Na, Fe and Cu. However, in the present invention, the content of elements such as Na, Fe and Cu is preferably 1 ppm or less, and the content of Na, Fe and Cu in the glass of the present invention is preferably 1 ppm or less. This makes the glass of the present invention more suitable for use in semiconductor production processes.

The glass of the present invention contains no bubbles with diameters of more than 0.1 mm. Bubbles with diameters of more than 0.1 mm become a source of particles coming off from the glass upon exposure to a plasma atmosphere. The absence of such bubbles can be expected to reduce a decrease in semiconductor production yield when the glass of the present invention is used as an internal member a semiconductor production apparatus. In the present invention, "bubble" is a defect in glass. Although such defects may have any shape, they are typically observed as a substantially circular shape. Thus, in the present invention, the diameter of a bubble may be determined by measuring the area of the defect and calculating the equivalent circle diameter thereof.

In the present invention, the presence and area of bubbles (defects) may be determined from a micrograph obtained by optical microscopy on the glass. Optical microscopy can be performed, for example, using a digital microscope (e.g., VHX-6000, manufactured by Keyence Corporation) under the following conditions:

Observation magnification: 20×

Observation area: 2.28 cm$^2$

Although it is preferred that the glass of the present invention contain no bubbles (defects), the glass may contain bubbles (defects) with diameters of 0.1 mm or less as long as the advantages thereof are not compromised. For example, bubbles (defects) present in the glass the present invention may be bubbles with diameters of 0.005 mm or more and 0.1 mm or less, bubbles with diameters of 0.005 mm or more and less than 0.03 mm or bubbles with diameters of 0.01 mm or more and 0.02 mm or less.

In the glass of the present invention, the occupied area fraction of bubbles with diameters of 0.1 mm or less (hereinafter also referred to as "area fraction") is 0.05% or less, preferably 0.01% or less, 0.003% or less, 0.002% or less, 0.001% or less or 0.0007% or less. The glass of the present invention preferably contains no bubbles; in this case, the occupied area fraction is 0%. The glass of the present invention may contain fine defects as long as the advantages thereof are not compromised. For example, the occupied area fraction may be 0% or more, more than 0% or 0.0001% or more.

Furthermore, the glass of the present invention preferably contains no bubbles with diameters of 0.03 mm or more, and the occupied area fraction of bubbles with diameters of less than 0.03 mm (hereinafter also referred to as "area fraction (0.03)") is preferably 0.01% or less, more preferably 0.003% or less, 0.002% or less, 0.001% or less or 0.0007% or less. The area fraction (0.03) may be 0% or more or more than 0%.

Furthermore, the occupied area fraction of bubbles (hereinafter also referred to as "total area fraction") in the glass of the present invention is preferably 0.01% or less, more preferably 0.003% or less, 0.002% or less, 0.001% or less or 0.0007% or less. The total area fraction may be 0% or more or more than 0%.

The area fraction, the area fraction (0.03) and the total area fraction may be determined from the proportion (%) of the total area of bubbles (defects) with the corresponding diameters relative to the area (2.28 cm$^2$) of the observation area by analyzing a micro gray obtained by optical microscopy as described above using the image processing function of a digital microscope.

The glass of the present invention is a glass with durability to dry etching using plasma. For example, the corrosion rate of the glass of the present invention for a halide gas and its plasma may be 0.5 or less or 0.1 or less, with the corrosion rate of quartz glass being 1. Such properties allow for reduced wear of the glass during etching processes.

The glass of the present invention can be used as a plasma-resistant member comprising the glass, can be used as a plasma-resistant member for an apparatus, can be used as a plasma-resistant member a semiconductor production apparatus or a liquid crystal production apparatus or can be used as a member for a dry etching apparatus using plasma.

The present invention includes a glass member comprising the glass of the present invention and a glass member consisting of the glass of the present invention.

The present invention further includes a semiconductor production apparatus comprising a glass member of the present invention and a liquid crystal production apparatus comprising a glass member comprising the glass of the present invention.

The semiconductor production apparatus and liquid crystal production apparatus of the present invention may be, for example, apparatuses having a reaction chamber therein as a member comprising the glass of the present invention. A halide gas is introduced into the reaction chamber, and radio-frequency waves or microwaves are applied to the halide gas to generate a plasma. Because the reaction chamber is a glass member of the present invention, a thickness reduction during etching can be well inhibited even if the glass member is used in a dry etching apparatus in which a considerable thickness reduction tends to occur.

Method for Producing Glass

The glass of the present invention can be produced by a method comprising the following steps.

A method for producing a glass, comprising the steps of:

(1) placing raw material powders for at least one oxide of Si and a di- or higher-valent metal element (multivalent metal element) in a container, mixing the raw material powders together and then melting the mixture by heating under reduced pressure to obtain a melt;

(2-1) pressurizing the melt in a He gas atmosphere, or (2-2) heating the melt in an inert gas atmosphere other than a He gas atmosphere and then pressurizing the melt in the inert gas atmosphere; and (3) cooling the melt.

The method for producing the glass of the present invention is a production method comprising a step of pressurizing a melt containing an oxide of Si and an oxide of at least one multivalent metal element in an inert gas atmosphere. More preferably, the method for producing the glass of the present invention is a production method comprising a step of pressurizing a melt containing an oxide of Si and an oxide of at least one multivalent metal element in at least one of a He gas atmosphere or a nitrogen gas atmosphere. More preferably, the method for producing the glass of the present invention is a production method comprising a step of pressurizing a melt containing an oxide of Si and an oxide of at least one multivalent metal element in a He gas atmosphere or a step of heating and then pressurizing the melt in a nitrogen gas atmosphere.

Step (1)

Step (1) is a step of placing raw material powders for at least one oxide of Si and a multivalent metal element in a container, mixing the raw material powders together and then melting the mixture by heating under reduced pressure to obtain a melt.

The composition of the at least one oxide of Si and a multivalent metal element may be identical to the composition of the glass of the present invention described in the "Glass" section.

The raw material powders may be, for example, powders of an oxide of Si and an oxide, carbonate or nitrate of a multivalent metal element.

The raw material powder for an oxide of Si may be, for example, at least one of an oxide containing Si, a carbonate containing Si or a nitrate containing Si, may be an oxide of Si, may be at least one selected from the group consisting of natural silica, synthetic silica, precipitated silica, colloidal silica, fumed silica, sol-gel silica, quartz and quartz crystal or may be at least one selected from the group consisting of natural silica, quartz and quartz crystal, or quartz crystal.

If the multivalent metal element is Al, the raw material powder for an oxide of Al may be, for example, at least one of an oxide of Al or a nitrate of Al, may be an oxide of Al or may be alumina ($Al_2O_3$).

If the multivalent metal element is an M element, the raw material powder for an oxide of the M element may be, for example, at least one selected from the group consisting of an oxide of the M element, a carbonate of the M element and a nitrate of the M element, may be at least one of an oxide of the M element or a carbonate of the M element or may be an oxide of the M element.

The raw material powders preferably have high purity, particularly, contain no metal impurities. More specifically, the content of elements such as Na, Fe and Cu is preferably 1 ppm or less. The total content of Na, Fe and Cu in each raw material powder is preferably 1 ppm or less.

In step (1), the raw material powders are placed in a container, are mixed together, and are then melted by heating under reduced pressure to obtain a melt (first melting).

The container used in step (1) is a known container for use in melting by heating and may be, for example, a container formed of at least one selected from the group consisting of carbon, a heat-resistant metal and a refractory ceramic.

The mixing of the raw material powders may be performed by any known process that allows the individual raw material powders to be uniformly mixed together. For example, the mixing process may be at least one of a dry process or a wet process, preferably a dry process.

The reduced pressure may be, for example, 15 Torr or less or 10 Torr or less. The degree of vacuum in step (1) need not be higher than necessary and may be, for example, 0.01 Torr or more.

The heating temperature may be, for example, 1,500° C. or higher or 1,525° C. or higher, and 2,000° C. or lower or 1,700° C. or lower. If the melt obtained under the above conditions, the glass finally obtained by the method of the present invention contains no bubbles with diameters of more than 0.1 mm, and the occupied area fraction of bubbles with diameters of 0.1 mm or less is 0.05% or less, 0.01% or less or 0.003% or less. The reduced pressure is preferably 0.01 to 10 Torr. The heating temperature is prefer a 1,500° C. to 2,000° C.

The reduced pressure in step (1) is preferably 10 Torr or less, and the heating temperature in step (1) is preferably 1,500° C. or higher.

Although the heating time may be adjusted as appropriate depending on the amounts of raw material powders supplied to the process and the performance of the melting furnace used, the heating time may be, for example, 30 minutes or more and 5 hours or less, or 50 minutes or more and 3 hours or less.

Steps (2-1) and (2-2)

In the method for producing the glass of the present invention, the melt obtained in step (1) is pressurized in step (2-1) or (2-2). That is, the production method of the present invention comprises step (1) and step (2-1) or (2-2).

In step (2-1), the melt is pressurized in a He gas atmosphere. The melt is pressurized in a He gas atmosphere and is then cooled in step (3) to obtain the glass of the present invention.

The pressurization in a He gas atmosphere is performed at a temperature at which the molten state of the melt can be maintained and may be the same as or different from the temperature in step (1). A temperature at which the molten state of the melt can be maintained allows bubbles in the melt, particularly bubbles with diameters of more than 0.1 mm, to be relatively easily reduced. The pressurization in a He gas atmosphere in step (2-1) is preferably pressurzation at a temperature of 1,500° C. or higher or 1700° C. or higher, and 2,000° C. or lower or 1,850° C. or lower.

A He gas atmosphere is an atmosphere containing only He gas and may be, for example, a He gas flow atmosphere.

The pressure during the pressurization in a He gas atmosphere in step (2-1) is, for example, 0.05 MPa or more, preferably 0.1 to 1 MPa (0.01 MPa or more and 1 MPa or less).

Although the time of pressurization of the melt in a He gas atmosphere may be adjusted as appropriate depending on the temperature during the pressurization and other factors, the pressurization time may be, for example, 1 to 48 hours (1 hour or more and 48 hours or less), preferably 5 minutes or more and 60 minutes or less, or 10 minutes or more and 30 minutes or less.

In step (2-2), the melt is heated in an inert gas atmosphere other than a He gas atmosphere and is then pressurized in the inert gas atmosphere.

An inert gas atmosphere other than a He gas atmosphere may be, for example, a nitrogen gas atmosphere, a rare gas atmosphere or a mixture thereof, and may be, for example, at least one of a nitrogen gas atmosphere or an Ar gas atmosphere, a nitrogen gas atmosphere or a nitrogen gas flow atmosphere.

The heating in an inert gas atmosphere other than a He gas atmosphere may be performed at a temperature at which the molten state of the melt can be maintained and may be the same as or different from the heating temperature in step (1). The heating in an inert gas atmosphere other than a He gas atmosphere may be performed at a temperature of, for example, 1,500° C. or higher or 1,700° C. or higher, and 2,000° C. or lower or 1,800° C. or lower.

Although the time of heating in an inert gas atmosphere other than a He gas atmosphere may be adjusted as appropriate depending on temperature and other factors, the heating time is preferably, for example, 5 minutes or more and 60 minutes or less, or 10 minutes or more and 30 minutes or less.

In step (2-2), after the melt is heated in an inert gas atmosphere other than a He gas atmosphere, the melt is pressurized in the inert gas atmosphere. The pressurization process may be known pressurization process and is preferably at least one of a hot pressing process or a hot isostatic pressing process, or a hot isostatic pressing (hereinafter also referred to as "HIP") process. The pressure during the pressurization in an inert gas atmosphere other than a He gas atmosphere in step (2-2) may be, for example, 0.05 MPa or more, or 0.1 to 1 MPa. On the other hand, the preferred pressure may be, for example, 10 MPa or more or 60 MPa or more, and 200 MPa or less or 150 MPa or less. The pressurization in an inert gas atmosphere other than a He gas atmosphere may be performed at a temperature of 1,000° C. or higher or 1,050° C. or higher, and 1,500° C. or lower or 1,300° C. or lower.

This process allows bubbles in the melt, particularly bubbles with diameters of 0.1 mm or more, to be relatively easily reduced.

Although the time of pressurization in an inert gas atmosphere other than a He gas atmosphere may be adjusted as appropriate depending on the temperature and pressure during the pressurization, the performance of the HIP process apparatus used and other factors, the pressurization time is preferably, for example, 5 minutes or more and 5 hours or less, or 30 minutes or more and 3 hours or less.

The total time of heating and pressurization of the melt in step (2-2) may be, for example, 1 to 48 hours (1 hour or more and 48 hours or less).

Step (3)

In step (3), the melt is cooled after the pressurization. The atmosphere and pressure during the cooling may be similar to those in step (2-1) or (2-2). That is, is the case of step (2-1), the melt may be cooled to room temperature in a He gas atmosphere at 0.05 MPa or more, or 0.1 MPa or more and 1 MPa or less. In the case of step (2-2), the melt may be cooled to room temperature in an inert gas atmosphere other than a He gas atmosphere, or a nitrogen atmosphere, at 0.05 MPa or more, or 0.1 MPa or more and 1 MPa or less. Thus, the glass of the present invention is obtained.

By setting appropriate conditions for steps (1) to (3) in the production method of the present invention, the occupied area fraction of bubbles with diameters of 0.1 mm or less in the resulting glass of the present invention can be controlled to the desired level, preferably 0.05% or less, 0.01% or less or 0.003% or less.

EXAMPLES

The present invention will now be more specifically described with reference to the following examples. It should be understood, however, that these examples are merely illustrative of the present invention, and the present invention is not limited to these examples.

Evaluation Methods (1) Bubble Count

Fabricated glasses were machined to a size of Φ80 mm×30 mm in thickness, and the top and bottom main surfaces (Φ80 mm surfaces) thereof were polished. The number of bubbles (bubbles) in an observation area of each machined glass was counted under a digital microscope (the product name VHX-6000, manufactured by Keyence Corporation), and the number of bubbles in an area of 1 cm$^2$ (bubbles/cm$^2$) was evaluated as the bubble count. The number of bubbles was counted by performing focusing every 0.1 μm from the top surface to the bottom surface of the glass in the thickness direction of the glass in the observation area (2.28 cm$^2$) and finding ail bubbles present in the observation area in the diameter direction and the thickness direction.

(2) Occupied Area Fraction

The area occupied by bubbles was calculated from the diameters and number of bubbles obtained by the image processing function of the digital microscope, and the occupied area fraction in an area of 1 cm$^2$ was calculated. Specifically, the equivalent circle diameter (diameter) of each bubble was calculated from the area of the bubble obtained by the image processing function of the digital microscope and was considered as the diameter of that bubble. The proportion of the total area (mm$^2$) of bubbles with diameters of 0.1 mm or less relative to the observation area (2.28 cm$^2$) under the digital microscope was then calculated as the occupied area fraction (%) in an observation area of 1 cm$^2$ (hereinafter also referred to as "area fraction").

The proportion (%) of the total area (mm$^2$) of bubbles with diameters of less than 0.03 mm relative to the observation area (2.28 cm$^2$) under the digital microscope was calculated as the area fraction (0.03). In addition, the proportion of the total area (mm$^2$) of bubbles relative to the observation area (2.28 cm$^2$) under the digital microscope was calculated as the total area fraction.

(3) Compositional Analysis

The glass composition was determined by X-ray fluorescence spectroscopy.

Example 1

A glass was fabricated by placing raw material oxides with a particle size of 5 μm or less and a quartz crystal powder with a particle size of 220 μm in a container, thoroughly stirring and mixing the raw material powders together and melting the mixture in an electric melting furnace under the conditions in Table 1. Specifically, an alumina (Al$_2$O$_3$) powder with a particle size of 0.3 μm, an yttrium oxide (Y$_2$O$_3$) powder with a particle size of 4 μm and a quartz crystal (SiO$_2$) powder with a particle size of 220 μm were weighed in an atomic ratio of Si:Al:Y=33.2:39.1: 27.7. 3 kg of the weighed powders were charged into a 10 L polyethylene container and were homogeneously mixed together by a dry process to obtain a mixed powder. The resulting mixed powder was charged into a carbon container, and the container was then placed in an electric melting furnace (the apparatus name FVPSR150/200, manufactured by Fuji Dempa Kogyo Co., Ltd.). Thereafter, a vacuum atmosphere with a degree of vacuum of 10 Torr was created, and the mixed powder was subjected to melting treatment by heating the mixed powder to 1,550° C. at a heating rate of 2° C./min in the atmosphere and then heating the mixed powder at that temperature for 60 minutes (first melting). After the first melting, the mixed powder was subjected to melting treatment by heating the mixed powder to 1,725° C. at a heating rate of 2° C./min and then heating the mixed powder at that temperature and 0.05 MPa for 20 minutes while introducing helium gas into the electric melting furnace (second melting). After the second melting, the melt was cooled to room temperature, and the glass was collected from the electric melting furnace. Thus, a glass of this example was fabricated.

The fabricated glass was cut and polished on both surfaces to a cylindrical shape with a size of 80 mm in diameter×30 mm in thickness. The bubble count, the area fraction, the area fraction (0.03) and the total area fraction were then measured.

Example 2

A glass was fabricated by placing raw material oxides with a particle size of 5 μm or less and a quartz crystal powder with a particle size of 220 μm in a container, thoroughly stirring and mixing the raw material powders together and melting the mixture in an electric melting furnace under the conditions in Table 1. Specifically, a glass of this example was fabricated by performing the same procedure as in Example 1 except that nitrogen gas was introduced into the electric melting furnace instead of helium gas after the first melting and the mixed powder was heated to 1,750° C. and was subjected to melting treatment at that temperature in the second melting (hereinafter also referred to as "standard conditions"), followed by a HIP process at a process temperature of 1,100° C. and a process pressure of 137.2 MPa in a nitrogen atmosphere for 2 hours.

Comparative Example 1

A glass was fabricated by placing raw material oxides with a particle size of 5 μm or legs and a quartz, crystal powder with a particle size of 220 μm in a container, thoroughly stirring and mixing the raw material powders together and melting the mixture in as electric melting furnace under the conditions in Table 1. Specifically, as a method in the related art, a glass of this comparative example was fabricated under the standard conditions.

Figure 1B:
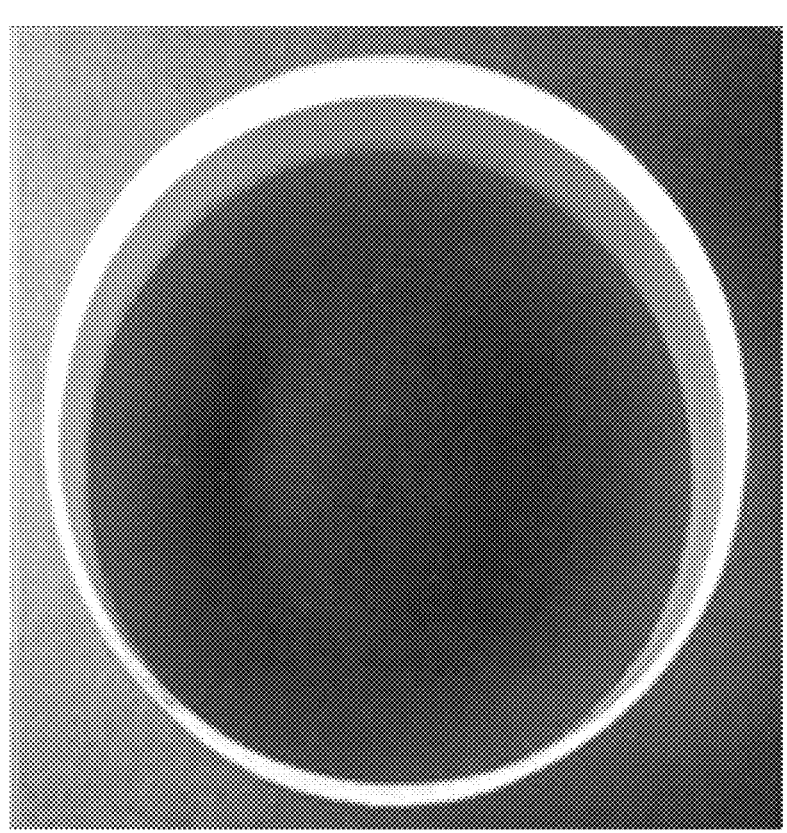
FIG. 1B is an illustration of a glass of Example 2.
Figure 1C:
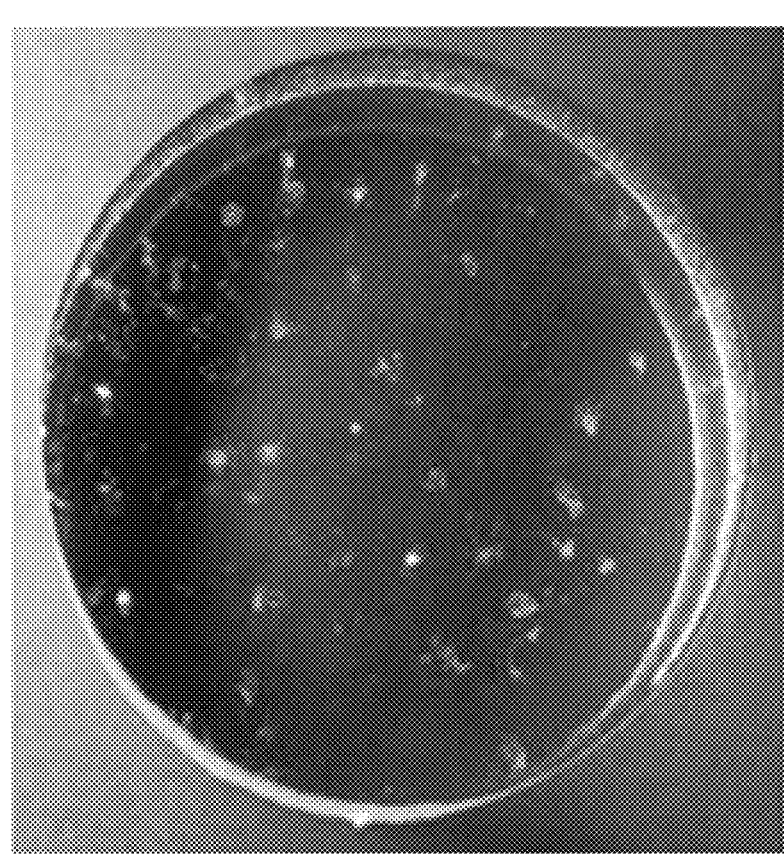
FIG. 1C is an illustration of a glass of Comparative Example 1.

The results for the Examples and the Comparative Example are listed in Table 1, and shown in FIGS. 1A-1C.

TABLE 1

| Item | Example 1 | Example 2 | Comparative Example 1 |
|---|---|---|---|
| Conditions | Second melting with He gas introduced instead of nitrogen gas First melting: | Melting under standard conditions, followed by HIP process First melting: 1,550° C. × | Method in related art First melting: 1,550° C. × 60 min (Vac) Second melting: |

TABLE 1-continued

| Item | Example 1 | Example 2 | Comparative Example 1 |
|---|---|---|---|
| | 1,550° C. × 60 min (Vac) Second melting: 1,725° C. × 20 min (He) | 60 min (Vac) Second melting: 1,750° C. × 20 min (N₂) HIP process: 1,100° C. × 137.2 MPa | 1,750° C. × 20 min (N₂) |
| Composition | SiO₂: 28 wt %/Al₂O₃: 28 wt %/Y₂O₃: 44 wt % → (atomic % in metal atoms) Si: 33.2%, Al: 39.1%, Y: 27.7% | | |
| Cluster of bubbles | FIG. 1A | FIG. 1B | FIG. 1C |
| Bubble count (bubbles/cm²) | 2 | 2 | 24 |
| Area fraction (%) | 0.0003 | 0.0002 | 0.06 |

For the glasses of both Examples, the number of bubbles with diameters of more than 0.1 mm was 0 bubbles/cm², and no cracks were found. In addition, the maximum diameter of bubbles in Example 1 was 0.017 mm, and the maximum diameter of bubbles in Example 2 was 0.012 mm. In contrast, for the glass of the Comparative Example, the number of bubbles with diameters of more than 0.1 mm was 24 bubbles/cm², and the maximum diameter of bubbles was 0.12 mm. In addition, the atomic fraction of the M element (Y) to Al in the glasses of the Examples was 0.71, and the content of the multivalent metal elements (total content of Al and Y) was 66.9 atomic percent.

In addition, the area fraction, the area fraction (0.03) and the total area fraction in Example 1 were all 0.0003%, and the area fraction, the area fraction (0.03) and the total area fraction in Example 2 were all 0.0002%. In contrast, in Comparative Example 1, the area fraction was 0.06%, the area fraction (0.03) was 0.0008% and the total area fraction was 0.11%.

Thus, whereas many bubbles (cluster of bubbles) remained in the glass of Comparative Example 1 (glass in the related art), no bubbles with diameters of more than 0.1 mm were found in the glasses of Examples 1 and 2, and the occupied area fractions of bubbles with diameters of 0.1 mm or less (area fractions) in both Examples were low.

The present invention is useful in fields related to glass materials for members such as those for semiconductor production apparatuses and liquid crystal production apparatuses using plasma.

What is claimed is:

1. A method for producing a glass comprising at least one oxide of Si and a di-or higher-valent metal element, the method comprising the steps of:
    (1) placing raw material powders for the at least one oxide of Si and the di-or higher-valent metal element in a container, mixing the raw material powders together and then melting the mixture by heating under reduced pressure to obtain a melt;
    (2-2) heating the melt in an inert gas atmosphere which is at least one of a nitrogen gas atmosphere or an Ar gas atmosphere for 10 minutes or more and then pressurizing the melt in the inert gas atmosphere for 30 minutes or more; and
    (3) cooling the melt to obtain a glass containing no bubbles with diameters of more than 0.1 mm, wherein in the obtained glass:
    an occupied area fraction of bubbles with diameters of 0.1 mm or less is 0.05% or less, and
    the di-or higher-valent metal element contains at least one selected from the group consisting of Y, La, and Ce.

2. The production method according to claim 1, wherein the reduced pressure in step (1) is 10 Torr or less, and a heating temperature in step (1) is 1,500° C. or higher.

3. The production method according to claim 1, wherein the heating in the inert gas atmosphere in step (2-2) is performed at a temperature of 1,500°° C. or higher.

4. The production method according to claim 1, wherein a pressure during the pressurization in the inert gas atmosphere in step (2-2) is 10 MPa or more and 200 MPa or less.

5. The production method according to claim 1, wherein the melt is cooled to room temperature at 0.1 MPa or more and 1 MPa or less in step (3).

6. The production method according to claim 1, wherein the mixing in step (1) is performed by homogeneously mixing the raw material powders together via a dry process and then melting the mixture that resulted from the dry process.

7. The production method according to claim 1, wherein the oxide is an oxide of Si, Al and at least one selected from the group consisting of Y, La, and Ce.

8. The production method according to claim 7, wherein a content of Al is 30 atomic percent or more and 45 atomic percent or less, and the content of Y, La, and Ce is 20 atomic percent or more and 30 atomic percent or less.

9. The production method according to claim 7, wherein the atomic ratio of Y, La, and Ce to Al is 0.5 or more and 10 or less.

10. The production method according to claim 1, wherein the time of heating the melt in the inert gas atmosphere in step (2-2) is 10 minutes or more and 30 minutes or less.

11. The production method according to claim 1, wherein the time of pressurizing the melt in the inert gas atmosphere in step (2-2) is 30 minutes or more and 3 hours or less.

12. The production method according to claim 1, wherein the content of the di-or higher-valent metal element is 20 atomic percent or more.

13. The production method according to claim 1, wherein the time of heating under reduced pressure to obtain the melt in step (1) is 50 minutes or more.

14. The production method according to claim 1, wherein the heating under reduced pressure to obtain the melt in step (1) is performed at a temperature of 1,500° C. or higher and 1,550° C. or lower.

* * * * *